Sept. 19, 1961 W. E. INGHAM 3,001,176

MESSAGE SELECTION IN ELECTRICAL COMMUNICATION OR CONTROL SYSTEMS

Filed Aug. 4, 1954 6 Sheets-Sheet 1

INVENTOR
W. E. Ingham
By Glascock Downing & Seebold
ATTYS.

INVENTOR
W. E. Ingham
By Glascock Downing & Seebold
ATTYS

Sept. 19, 1961 W. E. INGHAM 3,001,176

MESSAGE SELECTION IN ELECTRICAL COMMUNICATION OR CONTROL SYSTEMS

Filed Aug. 4, 1954

6 Sheets-Sheet 3

INVENTOR
W. E. Ingham
By Glascock Downing & Seebold
ATTYS.

INVENTOR
W. E. Ingham
By Glascock Downing & Seebold
ATTYS.

INVENTOR
W. E. Ingham
By Glascock Downing & Seebold
ATTYS.

Sept. 19, 1961 W. E. INGHAM 3,001,176

MESSAGE SELECTION IN ELECTRICAL COMMUNICATION OR CONTROL SYSTEMS

Filed Aug. 4, 1954

6 Sheets-Sheet 6

INVENTOR

W. E. Ingham

By Glascock Downing & Seebold

ATTYS.

United States Patent Office 3,001,176

Patented Sept. 19, 1961

3,001,176

MESSAGE SELECTION IN ELECTRICAL COMMUNICATION OR CONTROL SYSTEMS

William Ellis Ingham, Ealing, London, England, assignor to Electric & Musical Industries Limited, Hayes, England, a company of Great Britain Filed Aug. 4, 1954, Ser. No. 447,803
Claims priority, application Great Britain Aug. 6, 1953
13 Claims. (Cl. 340—147)

Figures 1, 2:
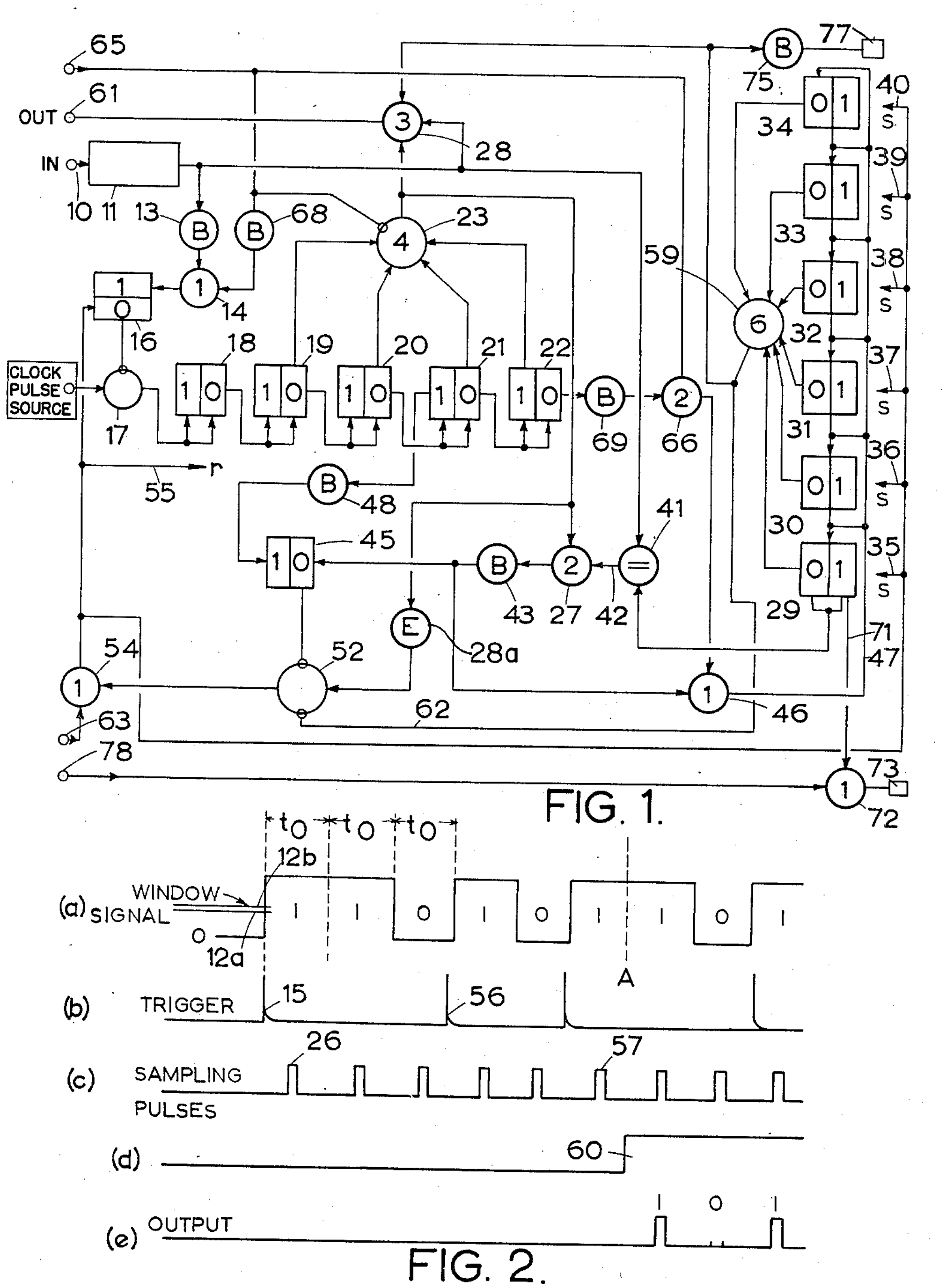

This invention relates to electrical communication or control systems.

In certain communication or control systems, automatic message selection is an essential requirement. For example, it may be necessary to accept some but not all of a series of messages arriving at a receiving location or alternatively, it may be necessary to route messages at a distributing location selectively to different channels. The messages to be selected may, for example, be transmitted serially over a common cable channel or on a common carrier wave, or in some cases may be transmitted over different channels. The requirements indicated may arise, for example, in a remote control system where it is desired to exercise control over several separate functions or in an information interchange system involving numbers of transmitting and receiving stations.

The construction of apparatus for effecting message selection is, however, usually associated with practical difficulties and one object of the present invention is to reduce such difficulties.

Another object of the present invention is to provide electrical communication or control apparatus having means for selecting messages in dependence upon multi-element binary pulse code recognition signals forming part of the messages.

One problem which is encountered where message selection is effected in dependence upon recognition signals at the beginning of the messages is that operation of the selecting means may be initiated by spurious signals such as interference and noise. These will subsequently be rejected since it is improbable that spurious signals will simulate the whole of a recognition signal but nevertheless spurious operation of the selecting means may lead to failure to select a correct message owing to the fact that spurious signals may result in the selecting means being in a state of unreadiness when the correct message arrives.

A further object of the present invention is to reduce this difficulty, and provide electrical communication or control apparatus having means for selecting messages in dependence upon multi-element pulse code recognition signals at the beginning of the messages, said means including means for comparing the elements of the recognition signal of an applied message individually on reception of said elements with the corresponding elements of a predetermined recognition signal. An incorrect element in a recognition signal, or in any spurious signals which simulates a recognition signal, is detected immediately so that the selecting means can be conditioned to re-start selection directly after the spurious signals or the incorrect signals end. In this way the possibility of missing a correct signal is reduced.

A further object of the invention is to provide comparison means comprising a sampling pulse generator for timing successive comparisons, the sampling pulses being of short duration compared with the duration of elements of the recognition signal. Fulfilment of this object improves the discrimination of the selecting means against random spurious signals such as noise. Moreover, in order that synchronism may be maintained between the source from which the message is transmitted and the selecting means, without the need of a synchronising channel, it is preferably arranged that the sampling pulse generator comprises a frequency dividing circuit and means responsive to an initial part of an applied message for gating independently generated periodic timing signals to said dividing circuit, said timing signals having a frequency which is high compared with the frequency of elements of the recognition signal, and said dividing circuit being arranged to derive sampling pulses from said timing pulses having the same frequency as said elements. It will be appreciated that when the sampling pulses are generated in this way, the error in the timing of the sampling pulses does not exceed plus or minus half the period of the timing pulses of high frequency. The error can, therefore, be made small in comparison with the duration of the elements of the recognition signal so that incorrect sampling does not arise.

This feature may have more general application and accordingly, therefore, another object of the present invention is to provide electrical communication or control apparatus comprising means for transmitting pulse code signals in which the code elements have a predetermined frequency, and receiving means having means for sampling the code elements during intervals of said predetermined frequency which are short compared with the period of the code elements, and wherein the timing of the signals at the transmitting means and of said intervals at the receiving means is determined by independent timing signal generators which have the same frequency, said last-mentioned frequency being high compared with said predetermined frequency, whereby phase differences between said generators do not give rise to sampling errors.

Another object of the present invention is to provide means for initiating operation of said comparison means in response to an initial part of an applied message and means for preventing re-initiation of operation of said comparison means during the same applied message.

The invention can be applied where the recognition signal is coded by means of pulses of a single polarity. This, however, implies that the communication channel has provision for transmitting a D.C. component and in some cases it may be inconvenient to make this provision. The recognition signal may then be coded by means of an A.C. pulse code in which the polarity of the coded signal is reversed midway through each digit interval so that the mean D.C. component of the signal is zero. When an A.C. pulse code is employed, a disadvantage arises inasmuch as the polarity of the signal is liable to become reversed, for example due to accidental changes in transformers and the like, and a further object of the invention is to provide for sensing the polarity of a first element of a recognition signal and for reversing the polarity of the respective message if an undesired polarity is sensed.

Figure 3:
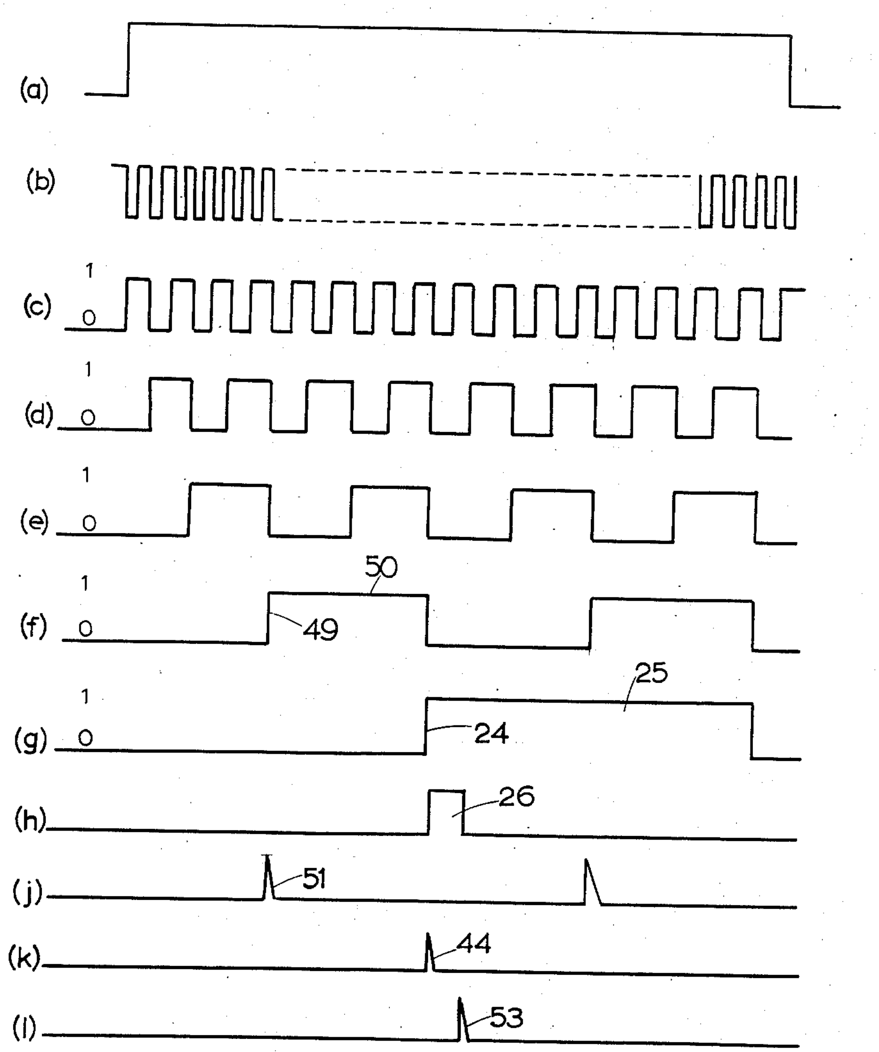
Figure 4:
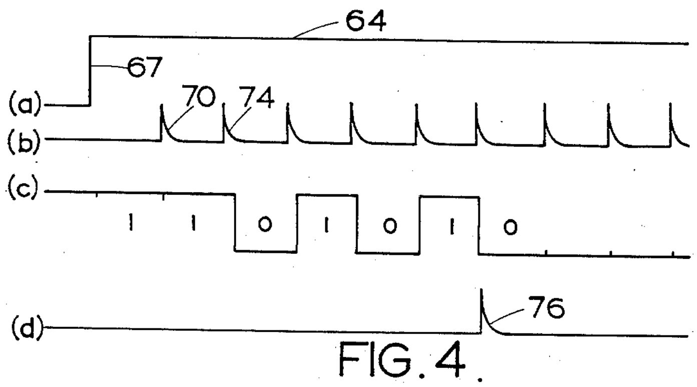
Figure 11:
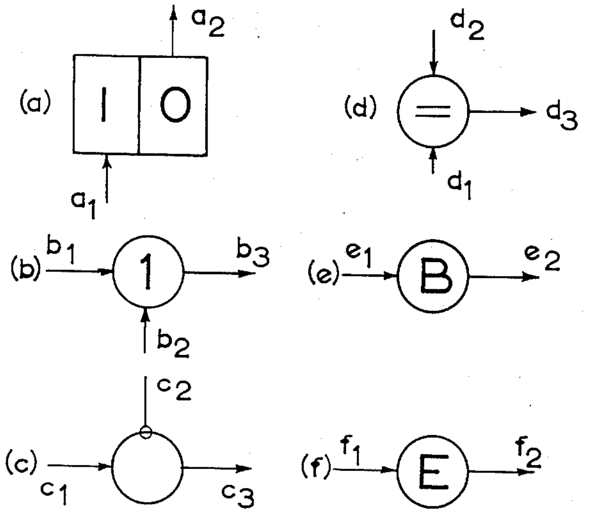
Figure 5:
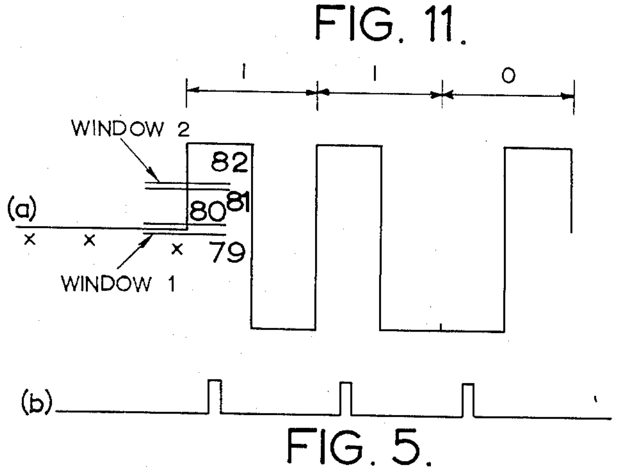
Figure 6:
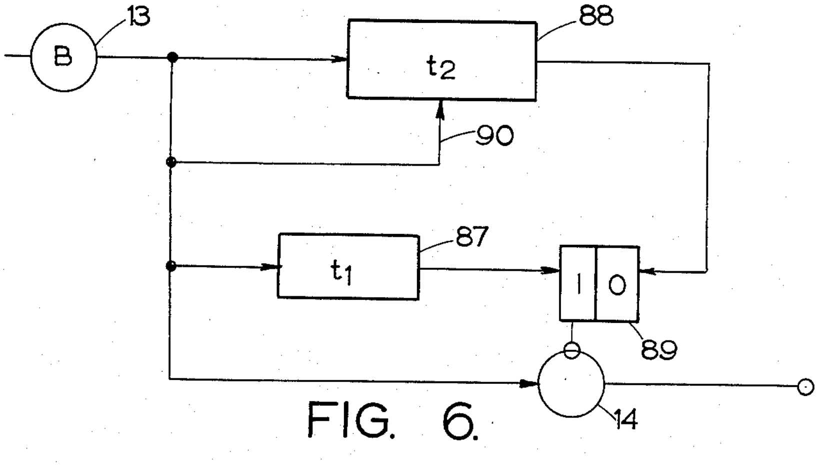
Figure 8:
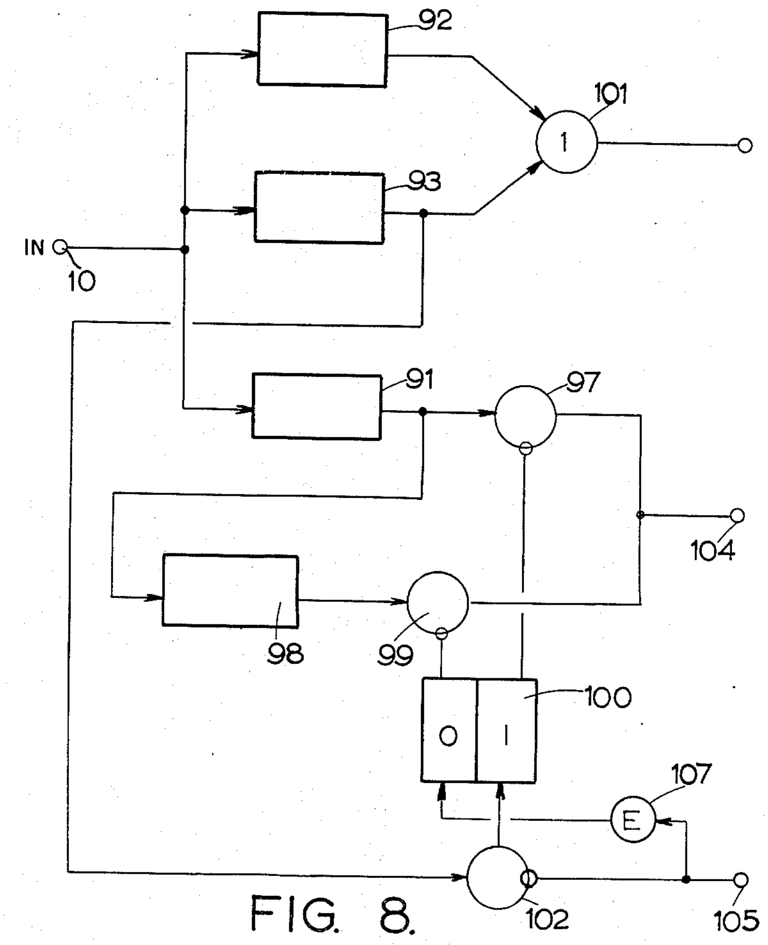
Figure 7:
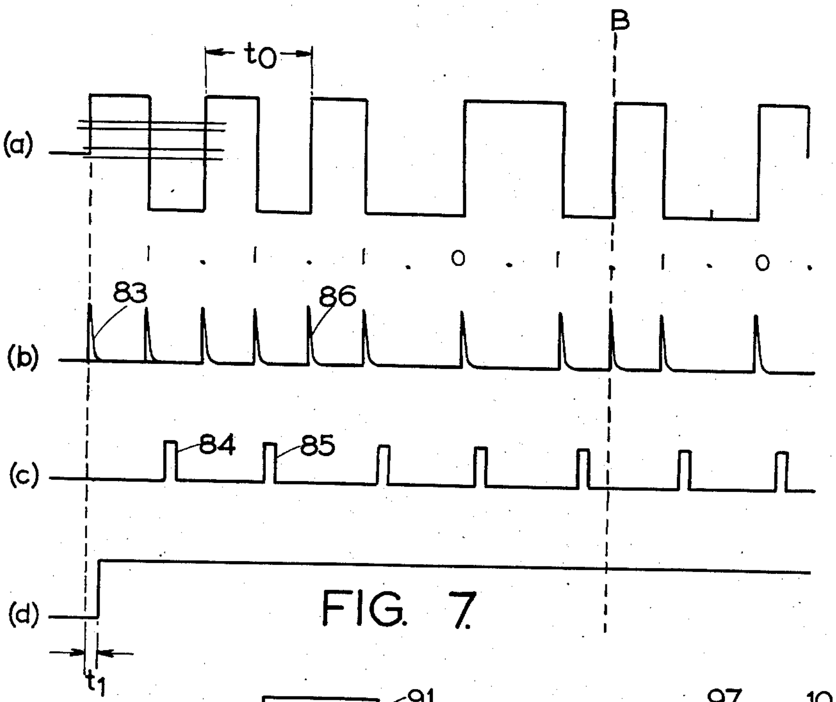
Figure 10:
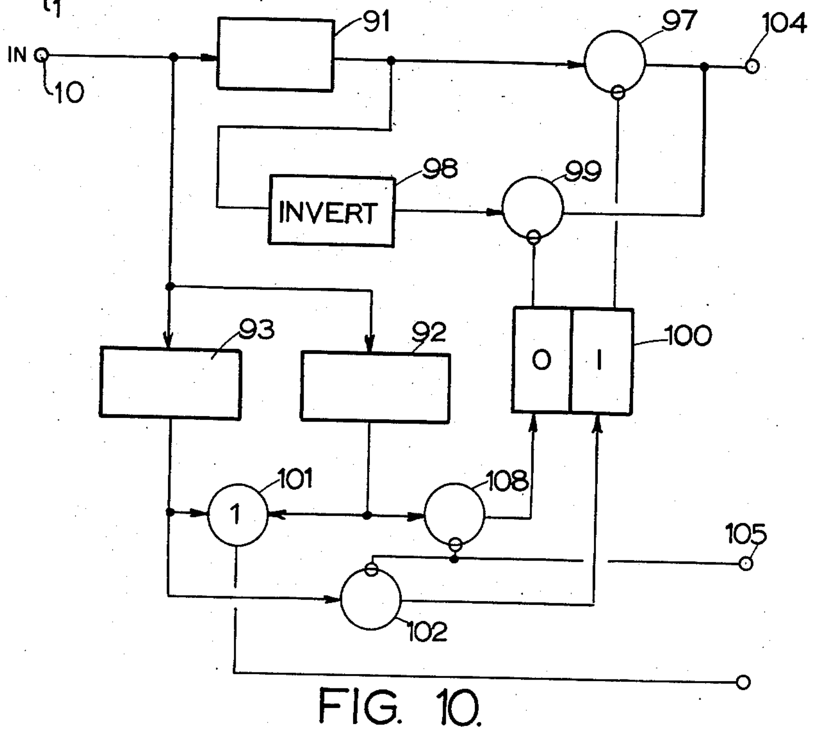
Figure 9:
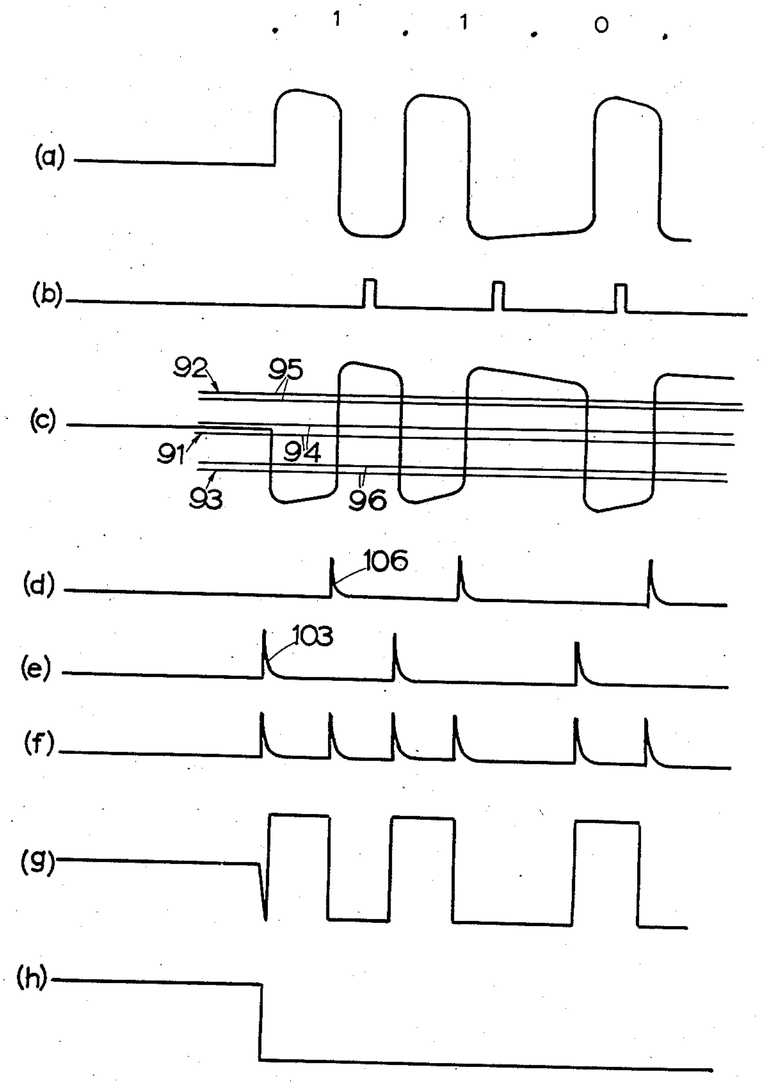

In order that the invention may be clearly understood and readily carried into effect, the invention will be described with reference to the accompanying drawings in which:

FIGURE 1 illustrates diagrammatically one example of selecting apparatus for a communication system in accordance with the present invention, FIGURES 2 to 4 comprise waveform diagrams explanatory of the operation of the present invention, FIGURE 5 is a waveform diagram which refers to a modification of FIGURE 1 designed for use with A.C. pulse code signals, FIGURE 6 illustrates diagrammatically means which may be incorporated in apparatus such as FIGURE 1 to prevent false operation of the selecting apparatus, FIGURE 7 is waveform diagrams explanatory of the operation of FIGURE 6, FIGURE 8 illustrates means which may be provided in apparatus such as FIGURE 1 to allow for polarity reversal of signals such as may arise if signals are transmitted in A.C. pulse code, FIGURE 9 comprises waveform diagrams explanatory of the operation of FIGURE 8, FIGURE 10 illustrates a modification of FIGURE 8, and FIGURE 11 illustrates symbols used in the drawings to represent conventional circuit units, in order to simplify the drawings and facilitate description thereof.

Referring first to FIGURE 11, the symbol (*a*) represents a two-state device, for example of the Eccles-Jordan type, consisting of two sections which are alternately energised in the different states of the device. When the device is in state 0, the section marked 0 is energised so that there is an output from the section on any output lead such as *a*2, whilst section 1 is not energised. In state 1, the outputs from the section marked 1 are energised, and those from section 0 are not energised. A pulse applied via an input connection such as *a*1 to a section of the device causes that section to become energised. When a pulse is shown applied to both sections, as in 18 . . . 22 of FIGURE 1, it is assumed to produce a change of state of the device.

Symbol (*b*) represents a pulse gate having input connections *b*1 and *b*2 and an output connection *b*3. The figure enclosed in the symbol denotes the threshold of the gate, the figure being 1 in the example illustrated, thereby indicating that a pulse applied to any one of the input connections, or simultaneous pulses applied to more than one input connection, produces a single pulse in the output connection. The figure 2 enclosed in the symbol would denote a gate of threshold 2 which would require the simultaneous application of pulses to two input connections to produce the single output pulse. A suitable form of pulse gate is described in the "Proceedings of the I.R.E," May 1950, page 511.

Symbol (*c*) denotes a pulse inhibitor gate having a normal input connection *c*1, an inhibit input connection *c*2 and an output connection *c*3. A pulse applied to *c*2 inhibits the transmission of pulses from *c*1 to *c*3. However, a negative or zero voltage on *c*2 permits the transmission of a pulse from *c*1 to *c*3. A pulse inhibitor gate may be of similar construction to a pulse gate such as represented by symbol (*b*), with, however, one of the controls reversed.

Symbol (*d*) represents a coincidence circuit having input connections *d*1 and *d*2 and an output connection *d*3. The circuit produces an output if the inputs applied to *d*1 and *d*2 are simultaneously of the same polarity or simultaneously zero. A suitable form of coincidence circuit is illustrated in "Electronic Engineering," December 1950, page 493, FIGURE 3.

Symbol (*e*) denotes a beginning element having input and output connections *e*1 and *e*2 respectively. The element produces a voltage spike in the output connection *e*2 on the occurrence of a leading edge of a pulse on its input connection *e*1. The element may for example comprise a differentiating circuit, which will of course produce alternate positive and negative spikes on the application of pulses to the input connection *e*1, followed by a limiter to remove the unwanted spikes in this case the second spike produced by the differentiating circuit.

Symbol (*f*) denotes an end element having input and output connections *f*1 and *f*2 respectively. The element produces a spike on its output connection *f*2 on the occurrence of a trailing edge of a pulse on its input connection *f*1. The element may comprise a differentiating circuit as in the case of the beginning element, followed by a limiter to remove the unwanted spike, in this case the front spike produced by the differentiating circuit.

In describing the operation of FIGURE 1, it will be assumed that the selector circuit is required to select messages which are preceded by a multi-element pulse code recognition signal, the code elements in the present example representing six binary digits, the first and last digit being of value 1 and the four remaining digits being of any predetermined value. The recognition signal is followed by the message proper which in this case is also transmitted in pulse code form. A fragment of a message such as the circuit is designed to select is shown in FIGURE 2(*a*). The recognition signal appears to the left of the vertical dotted line A whilst the beginning of the message proper appears to the right of this line. In this example binary digits of value 1 are represented by a positive voltage of a uniform value and binary digits of value zero are represented by zero voltage, each digit being allotted a time interval $t_0$.

The received message is applied via the input terminal 10 of the apparatus to a window 11 which consists of an amplitude discriminator set to accept only a certain small range of signal amplitudes within the limits represented by the horizontal lines 12*a* and 12*b* in FIGURE 2. The amplitude discriminator may be of any suitable construction and may consist for example of one or more appropriately biased valves. No output signal is therefore received from the window until the signal amplitude exceeds the threshold value 12*a* which is selected to render the selecting apparatus substantially insensitive to such noise as is likely to be encountered. Moreover by limiting at the upper level 12*b*, received signals are levelled to a uniform amplitude regardless to varying attenuation in the transmission channel, so that risk of an error in operation is reduced. The output from the window 11 is connected to a beginning element 13, the output of which is in turn connected to a gate 14 of threshold 1. At the beginning of a message, therefore, a spike 15 (FIGURE 2(*b*)) is set up by the element 13 and transmitted via gate 14 to a two-state device 16 where it is effective to trigger this device to state 1. The device 16 is connected to the inhibit input connection of an inhibitor gate 17 and except when a message is being received it remains in state 0 and inhibits the gate 17. However, pulse 15 opens the gate 17 and allows clock pulses to be applied to a series divider chain consisting of two-state devices 18 . . . 22 coupled in cascade. The construction of a series divider chain by the connection of two state devices in cascade is well known in the art, and a suitable construction is illustrated in FIGURE 17.3, page 605 of "Waveforms" in the M.I.T. Radiation Laboratory series of publications. A number of the clock pulses are indicated in FIGURE 3(*b*) and it will be assumed that these pulse are generated by a crystal oscillator, not shown, the period of the pulses being small compared with a digit interval $t_0$ denoted in FIGURE 3(*a*). Division of the clock pulses occurs in the chain 18 . . . 22 as represented by the waveform diagrams (*c*) to (*g*) in FIGURE 3, these diagrams illustrating the state of the two-state devices 18 . . . 22, the circuit being so arranged that each of these devices is initially in state 0 before division commences. Output connections lead from the right sections of the two-state devices 19, 20 and 21 and from the left section of device 22 to a pulse gate 23 of threshhold 4 and which has, moreover, an inhibit input connection which will be referred to subsequently. A pulse is delivered from the output connection of the gate 23 when the devices 19 . . . 21 are simultaneously in state 0 and device 22 is in state 1. This occurs at the time represented by the change 24 of curve 25 in FIGURE 3(*g*) which shows the state of element 22, that is after 16 clock pulses have been received by the divider chain from gate 17. The pulse delivered from the output of the gate 23 is represented by 26 in FIGURE 3(*h*) and it is fed in parallel to gates 27 and 28 and to an end element 28*a*, each pulse such as 26 serving as a sampling pulse. Since, as aforesaid the clock pulses are accurately controlled in frequency, each sampling pulse will occur at a similar position in each of the digit intervals throughout the signal. As the clock pulse frequency is much higher than the digit frequency, uncertainty regarding the exact timing of the sampling pulses relative to the digits is made small. Such uncertainty can arise, as previously mentioned, because the phase of the clock pulses for the selecting apparatus relative to the phase of the clock pulses used at the transmitter for timing the digits, is unknown. In the example described the uncertaintly does not exceed ±1/64 of a digit period. This uncertainty can of course be reduced by increasing the frequency of the clock pulses and the number of two-state devices in the divider chain. Moreover, it is clear that by varying the connections between the two-state devices in the chain 18 . . . 22 on the one hand, and the gate 23 on the other hand, both the duration and timing of the sampling pulses may be varied. Any desired delay can therefore be produced between the start of each digit and the occurrence of the sampling pulse.

The apparatus comprises a further series of two-state devices connected to form a shifting register, such as described for example in co-pending patent application No. 21,695/51. The devices 29 . . . 34 have input connections represented by the arrows 35 . . . 40 which, as will hereinafter appear are employed to set the devices 29 . . . 34 to the combination of states which represents the recognition signal corresponding to the selecting apparatus. The arrows 35 to 40 represent means for effecting "Sideways" loading of the register 29 . . . 34, and such means may be of any suitable construction, for example that described in U.S.A. patent specification No. 2,580,771. The recognition signal is thus stored in the shifting register 29 . . . 34, the first digit of the code being represented by the state of the device 29, the second digit of the code being represented by the state of the device 30, and so on. The output connection of the shifting register leads from the device 29 to a coincidence circuit 41 which has a second input connection from the window 11. Consequently if the first digit of a received message, transmitted through the window 11 corresponds to the state of the device 29, an output signal will appear on the output connection 42 of the coincidence circuit, the connection 42 forming the second input to the aforesaid gate 27. Therefore, if the first digits are alike, a pulse is set up in the output connection of the gate 27 during the sampling pulse 26 (FIGURE 3($h$)). This pulse applied to a beginning element 43 produces a spike, represented by 44 in FIGURE 3($k$), which is transmitted in parallel to one input connection of a two-state device 45 and to a pulse gate 46 of threshold 1. The pulse gate 46 feeds the shift busbar 47 of the shifting register 29 . . . 33. Therefore, if the coincidence circuit 41 shows identity between the first received digit and the first stored digit the pulse 44 is applied to the shift busbar 47 and shifts the state of each stage of the register one place so that the device 29 assumes the state representing the second digit of the recognition code, the device 30 assumes the state representing the third digit of the recognition code, and so on.

The two-state device 45 has a second input connection from a beginning element 48 which in turn receives its input from the left section of the two-state device 21 of the divider chain. The connection from the beginning element 48 sets the device 45 into state 1, at the time of the change 49 (in FIGURE 3($f$)) of device 21 from state 0 to state 1. The output from the beginning element is denoted by the pulse 51 in FIGURE 3($j$). The device 45 is connected to the inhibit input connection of a pulse inhibitor gate 52 in such a way that the gate is inhibited when the device is in state 0. The pulse 51 therefore removes the inhibition from the gate 52. The pulse 44 fed from the beginning element 43 to the device 45 when identity has been established between the first incoming digit and the first stored digit re-sets the device 45 in state 0 and re-establishes the inhibition on the gate 52. Therefore if identity is established the gate 52 has no effect in the operation of the selector apparatus. On the other hand if identity is not established the device 45 does not receive the pulse 44 and it remains in state 1, and the gate 52 remains uninhibited. The end element 28$a$ delivers a positive spike 53 (FIGURE 3($l$)) at the end of the sampling pulse 26 and this spike 53 can then be transmitted through the gate 52 to a gate 54 of threshold 1 which feeds an output in parallel to a re-setting connection 55 for the divider chain 18 . . . 22, to the setting connections 35 . . . 40 for the shifting register 29 . . . 34, and to an input connection of the two-state device 16. An output pulse from 54 restores the device 16 to state 0, re-sets the divider chain elements 18 . . . 22 to state 0 and restores the recognition signal to the register 29 . . . 34, and the apparatus is thus conditioned for testing the code signals of subsequent incoming messages. For convenience of illustration, the re-setting connections for the divider chain 18 . . . 22 is not shown in full, such connections being well known in the art and is represented by $r$ on the lead 55.

If the divider chain is not re-set as aforesaid, that is to say if identity is established between the first incoming digit and the first stored digit, the divider chain continues operating and on the occurrence of the 32nd clock pulse, all the devices in the divider chain revert to their initial states and a further cycle of operations commences. A second sampling pulse is generated after the appropriate delay and the second incoming digit is tested during the sampling pulse. The second incoming digit, as shown in FIGURE 2, is also of value 1.

It will be assumed that identity is again established and in due time a further cycle of operations commences. As shown in FIGURE 2($a$) the third digit of the recognition code of the incoming message is 0. The coincidence circuit 41 again delivers on input to the gate 27 since the device 29 is by then in state 0, representing the third stored digit, and testing continues. The fourth digit is 1 and this produces a further positive spike 56 from the beginning element 13, which, however, has no effect on the device 16 since it is already in state 1. When, as assumed in the present case, identity is finally established between the whole of the recognition signal of an incoming message and that originally stored by the register 29 . . . 34, the pulse produced from the gate 46 on testing the last digit by the sampling pulse 57 (FIGURE 2($c$)) produces state 0 in all the register devices 29 . . . 34. To ensure that the register "empty" state is not attained at an earlier time, it is arranged that the final recognition signal digit is always 1. The devices 29 . . . 34 have input connections to a pulse gate 59 of threshold 6, the connections being such that the pulses are applied to the gate by the corresponding register stages when they are switched to state 0. Pulse 60 (FIGURE 2($d$)) is therefore derived from the gate 59 when the register "empty" state occurs and this pulse is fed to an input connection of the gate 28. The gate 28 also receives an input of sampling pulses from the gate 23 and the incoming message is applied to it from the window 11. Consequently when identity has been established the gate 28 is conditioned for the transmission of the part of the message following the recognition signal to a utilisation circuit. This circuit is not shown since it may be of any desired form but it will be understood that the received message is passed to this circuit from the terminal 61. As represented in FIGURE 2($a$) the part of the message following the recognition signal is also coded in binary pulse code form, the digits being transmitted to the terminal 61 only during the sampling pulses from the gate 23, as represented by FIGURE 2($e$). The gate 59 delivers a second output to an inhibit input connection 62 of gate 52 when the register 29 . . . 34 is in the "empty" state, so that no further part of the incoming message is tested. At the end of the message, a pulse is applied to the terminal 63 to reset the selecting apparatus for the next signal in any suitable manner.

In practice the selecting circuit may be set in operation by spurious signals, such as interference and noise. These will subsequently be rejected because the selecting apparatus is reset on the first occasion identity is not established, so that the effect of the noise on the utilisation device is reduced. This advantage arises from the fact that the digits of the recognition signal are compared individually on reception with the corresponding elements of the recognition code set up in the register 29 . . . 34. This reduces the testing period to a minimum, and it avoids the need to receive and store the whole of a recognition signal before testing. Immediately an incorrect element is discovered in incoming signals the selecting circuit as a whole is reset. The time spent in checking spurious signals is therefore greatly reduced, particularly if a long recognition code is employed, and this reduces the possibility of failing to select a correct message in the event that testing has been falsely initiated by interference at some time just preceding the correct message.

The apparatus illustrated in FIGURE 1 can also be employed for generating a recognition code signal to be applied in front of a transmitted message, in a two-way communication system, provided that duplex working is not required. The apparatus is conditioned for this function, by first storing the recognition code in the register 29 . . . 34 and then applying a positive pulse 64 (FIGURE 4(*a*)) to terminal 65, the pulse 64 being arranged to have a duration at least equal to that of the message to be transmitted. The pulse 64 is applied to inhibit input connection of the gate 23 and to an input connection of a pulse gate 66 which has threshold 2. The leading edge 67 of the pulse 64 produces a spike from a beginning element 68 which is transmitted by gate 14 to two-state device 16. This admits clock pulses to the divider chain 18 . . . 22. The final device 22 of this chain has a connection through a beginning element 69 to the second input connection of the pulse gate 66. The connection from 22 to 69 is such that when the device 22 reverts to initial state, which occurs at the end of a first digit interval commencing with the leading edge 67 of pulse 64, the gate 66 which is open transmits a positive spike 70 to gate 46 and thence to the shift busbar 47 of the register 29 . . . 34. The register has an output connection 71 from 29 to a gate 72 of threshold 1 which in turn has an output connection to the transmitter which is represented by the reference 73. Until the occurrence of the spike 70 the transmitter 73 therefore receives a voltage from 29 representing the first digit of the recognition signal which is to be attached to the message to be transmitted. The pulse 70 shifts the state of the register by one place and the transmitter thereupon receives a signal corresponding to the second digit of the signal, this signal being maintained until the next spike 74 is transmitted from the gate 56 at the end of the second digit interval. By this process successive digits of the recognition signal are fed through the gate 72 to the transmitter 73. When the apparatus is conditioned for transmitting, no shift pulses are applied to the busbar 47 from the beginning element 43, since gate 23 is inhibited. Therefore the digits transmitted will be of correct duration since they are determined by the correct number of clock pulses. On completion of the recognition signal, the register 29 . . . 34 assumes the "empty" state and a positive pulse is delivered by the gate 59. This pulse is applied to a beginning element 75 which produces the spike 76 (FIGURE 4(*d*)) and this spike is applied to a trigger device connected to 77 which is then operated to initiate the transmission of the message proper. It will be assumed that the message proper is applied to the transmitter at the terminal 78 and is fed through the gate 72. During the transmission of the message, no signal is applied to the transmitter from the register since, as aforesaid, the register is "empty" so that input 71 to element 72 is not energised. The apparatus illustrated in FIGURE 1 is arranged to operate with a recognition signal consisting of six binary digits, the first and last of which have fixed values. The code therefore allows of 16 different recognition signals but it will be appreciated that a large number of recognition signals may be provided by increasing the number of digits in the code. Moreover, the message following the recognition signal need not necessarily be in pulse code form. Furthermore, the apparatus can be arranged to operate where the recognition code signals are in A.C. pulse code form as represented in FIGURE 5(*a*). With this code, the polarity of each digit is reversed mid-way through the digit interval so that the mean D.C. component of the signal is zero. When an A.C. pulse code is used in a recognition signal the sampling pulses can be arranged to occur either during the first half or the second half of the digit interval, sampling being represented in FIGURE 5(*b*) as occurring during the first half. Moreover, it is advantageous to have two windows in the selecting apparatus, the first window being arranged to transmit signals falling within amplitude limits such as 79 and 80 and a second window which is arranged to transmit signals within amplitude limits such as 81 and 82 in FIGURE 5(*a*). The second window is used to produce the trigger pulse for initiating operation of the selecting circuit, that is for switching the device 16 to its alternate state whilst the first window is used to limit the amplitude of the signals to be tested by the sampling pulses. If a signal such as shown in FIGURE 5(*a*) is transmitted by modulating a carrier wave and is received by a circuit employing automatic gain control means the recognition signal for each separate message is preferably preceded by a short period of unmodulated carrier so that the gain of the receiving circuit can be stabilised and the noise amplitude at the output reduced before the arrival of the digits.

In describing the modification shown in FIGURE 6, which is designed to reduce incorrect acceptances on account of the fact that parts of the message proper may simulate recognition signals, it is assumed that an A.C. pulse code is employed for transmitting the messages, the messages being for example transmitted by means of a radio link. A fragment of one message is shown in FIGURE 7(*a*). The part to the left of the vertical dotted line B constitutes the recognition signal and represents the binary digits 11101. It will be assumed that the selecting apparatus is set up to select messages which are preceded by the recognition signal 10110. FIGURE 7(*b*) illustrates the positive spikes which are produced by the beginning element corresponding to 13 in FIGURE 1 and each of these spikes is therefore capable of operating the two-state device 16 to admit clock pulses to the divider chain. As shown in FIGURE 7(*b*) there is a positive spike at each sudden amplitude transition in the pulse waveform, and this implies the use of three windows, as illustrated in FIGURE 8 in place of the single window 13 of FIGURE 1. If only two windows are employed, as indicated in FIGURE 5, alternate positive spikes will not occur. The first spike 83 starts the testing process producing the sampling pulse 84, FIGURE 7(*c*). This sampling pulse reveals identity between the first received digit and the first stored digit and conditions the apparatus for examining the next digit. However, identity is not established by the next sampling pulse 85 since the stored recognition signal has "0" in the second place whereas the incoming message has "1." Thereupon as the rest of the apparatus is arranged as in FIGURE 1, the divider chain and the register are re-set. However, the spike 86 produced by the leading edge of the next digit of the recognition signal would restart the testing cycle and the next five digits are such as to simulate the desired recognition signal and cause acceptance of the remainder of the message. To prevent this occurring, the spikes from the beginning element 13 are applied not only to the gate 14 but also to two delay circuits 87 and 88 (FIGURE 6). The delay time of 87 is relatively short and is represented by $t_1$ in FIGURE 7(*d*). The delay circuits 87 and 88 are connected to a two-state device 89. The gate 14 has an inhibit input connection coupled to the device 89 and as will hereinafter appear the device 89 remains in state 0 when the apparatus is conditioned for testing the incoming message. When the device 89 is in state 0 the inhibition is removed from the gate 14. Therefore the first spike 83 set up at the beginning of an incoming message can pass through the gate 14 and change the condition of the two-state device 16 as described with reference to FIGURE 1. However, after a delay of $t_1$ the positive spike 83 is also applied to the two-state device 89 from the delay circuit 87 and changes the device 89 to state 1. The gate 14 is then inhibited and prevents further spikes being transmitted through the gate 14 and the testing operation cannot restart. The inhibition is removed when the device 89 receives an input from the delay circuit 88. The delay time $t_2$ of the circuit 88 is made rather greater than digit interval $t_0$ (FIGURE 7(*a*)) and the circuit 88 has a second input connection 90 which "restarts" the delay each time element 13 produces a spike in response to a received pulse. The delay circuit 86 may for example comprise a circuit arranged to charge a condenser and produce an output pulse when the voltage to which the condenser is charged exceeds a predetermined threshold. The connection 90 for re-starting the delay may then be such as to switch on a discharger valve for the condenser so that the voltage across the condenser is restored to a datum level by each spike from the beginning element. With this arrangement the two-state device 89 will only be restored to the alternate state from that shown in the drawing when an interval $t_2$ has elapsed during which no digit is received. With a message of the form shown in FIGURE 7(*a*) this will occur only after the message has ended so that if a given message is rejected testing cannot be restarted until the end of the message. If, however, testing is initiated in response to random interference, testing can be re-started after an interval of $t_2$ from the occurrence of the interference.

When FIGURE 6 is incorporated in FIGURE 1 the beginning element 13 is connected to the window 11 and the gate 14 is connected to the two-state device 16 exactly as in FIGURE 1. There is of course an additional input to the gate 14 from the beginning element 68, as in FIGURE 1.

It will be appreciated that the modification shown in FIGURE 6 is only operable if an A.C. pulse code is employed, since when employing a D.C. pulse code, a succession of zeros could restore the device 89 to state 0. However, in practice the A.C. pulse code is more likely to be used than the D.C. pulse code.

With the modification shown in FIGURE 6, a higher degree of protection against false operation in the presence of random interference can be obtained with a fever number of digits in the recognition signal than would otherwise be the case. The modification is not confined in its application to cases where the message proper is transmitted in pulse code since it may be applied in some cases even if the message proper is transmitted in some form unlike the digital code employed for the recognition signal.

FIGURE 8 illustrates means for preventing errors from arising in the selection process due to polarity reversal of signals in A.C. pulse code. It will be assumed that each recognition code begins with a signal representing a digit of value one and that if the signals have the correct polarity their polarity is as indicated in FIGURE 9(*a*) and it will at once be apparent that if the polarity of the signals is reversed as shown in FIGURE 9(*c*) the sampling pulses of FIGURE 9(*b*) will not reveal identity between the received code signals and the stored code signals.

In the apparatus shown in FIGURE 8, three windows 91, 92, 93 respectively are provided. The window 91 is arranged to transmit signals within the amplitude range represented by the pair of lines 94 in FIGURE 9(*c*), the window 92 is arranged to transmit signals within the amplitude range represented by the pair of lines 95, and the window 93 is arranged to transmit signals within the amplitude range represented by the pair of lines 96. Window 91 feeds its output to a pulse inhibitor gate 97 and to polarity inverting circuit 98. The output of the polarity inverting circuit is in turn fed to a gate 99 and the gates 97 and 99 have inhibit input connections from opposite sides of a two-state device 100. The outputs of the windows 92 and 93 are applied to input connections of the gate 101 of threshold 1. The window 92 produces a positive spike each time a received signal waveform crosses the amplitude range 95 in the direction of increasing amplitude. If, therefore, the incoming waveform has the polarity shown in FIGURE 9(*c*), the output pulses from the window 92 are as represented in FIGURE 9(*d*). Similarly the window 93 is arranged to produce a spike each time the signal waveform crosses the amplitude range 96 in the direction of increasing amplitude. Each of the windows 92 and 93 may be in the form of amplitude discriminators followed in the case of 92 and 93 only by a differentiating circuit and a limiting circuit to remove the unwanted spike. Suitable amplitude discriminators are illustrated in "Waveforms" (published by the McGraw-Hill Book Company Inc. in 1949) in page 46, FIGURE 37. Since the function of the element 13 of FIGURE 1 is performed by the window 92 or 93, the element 13 is no longer necessary, and moreover the gate 101 may perform the function of gate 14 in FIGURE 1, in which case the output of gate 101 is applied directly to the two state device 16. The output of the gate 97 or 99 is applied directly to the coincidence circuit 41. The parts shown in FIGURE 8 therefore replace the parts 11, 13 and 14 of FIGURE 1, the remainder of the apparatus being unaltered. The output pulses from the window 93 are therefore as represented in FIGURE 9(*e*). The resultant output from the gate 101 is represented in FIGURE 9(*f*), and is applied via the gate 14 (FIGURE 1) to the two-state device 16 which initiates sampling pulse generation. The output from the window 93 is also applied to a pulse inhibitor gate 102. Assuming no inhibition is imposed on the gate 102, the first pulse 103 from the window 93 is applied to the two-state device 100 and triggers it to state 1. In this state, the gate 97 is inhibited and the inhibition is removed from the gate 99. Therefore the terminal 104 receives its signals through the polarity inverting circuit 98 and consequently if the signals have a polarity shown in FIGURE 9(*c*) polarity inversion occurs and the signals are restored to the correct polarity as shown in FIGURE 9(*g*). Since the inversion takes place before the first sampling pulse is generated, the sampling pulse will find the signal with the correct polarity and no error will be produced. The terminal 104 will be assumed to lead to the coincidence circuit 41 shown in FIGURE 1. The terminal 105 in FIGURE 8 has applied to it a negative pulse such as shown in FIGURE 9(*h*), the leading edge of this pulse occurring just after the pulse 103. The pulse of FIGURE 9(*h*) inhibits the gate 102 so that this gate is closed just after the pulse 103 passes through. The two-state device 100 then remains unaffected by any subsequent pulses derived from the window 93. The pulse of FIGURE 9(*h*) may readily be obtained from selecting apparatus such as shown in FIGURE 1, pulses derived from the two-state device 16 being for example suitable. However, any pulse which is initiated by the first pulse in the train (*f*) would be suitable. An end element 107 leads from the terminal 105 to an input connection of the two-state device 100 and by virtue of this end element, the device 100 is always changed to state 0 at the end of the operation of the selecting circuit.

With the apparatus shown in FIGURE 8, if the signal is received with correct polarity, an output pulse 106 would be received from the window 92 before any pulse is received from the window 93. This pulse will lead to the generation of the pulse (*h*) and consequently the gate 102 is inhibited before the generation of the pulse 103, and the device 100 remains in state 0 and inhibits the gate 99. The arrangement is then conditioned for the receipt of a message of correct polarity.

In the modification of FIGURE 8 which is illustrated in FIGURE 10, the pulses (FIGURE 9(*d*)) from the window 92 are also applied to the two-state device 100 through a pulse inhibitor gate 108. At the beginning of the selection process neither the gate 102 nor the gate 108 is inhibited. If a pulse is received first from the window 93 it passes through the gate 102 and sets the device 100 to state 1 and thereby it switches the polarity inverting circuit 98 into operation. If, on the other hand the first pulse is received from the window 92, the device 100 is switched into state 0 and the polarity inverting circuit 98 is prevented from becoming effective. As in the case of FIGURE 8, the initiation of the sampling pulse generation produces a pulse at the terminal 105, and this pulse inhibits both the gates 102 and 108 so that further operation of the device 100 is prevented until the end of the message.

The arrangement shown in FIGURE 10 has the practical advantage compared with that of FIGURE 8 in that it is unnecessary to ensure that an inhibiting pulse is always applied to the terminal 105 whenever a pulse changes the state of the device 100.

What I claim is:

1. Electrical communication or control apparatus having means for selecting messages in dependence upon multi-element recognition signals in time serial form, comprising a store for individually storing the elements of a predetermined recognition signal, normally quiescent comparison means, means responsive to a first element of the received message for initiating operation of said comparison means in substantial synchronism with recognition signal elements to compare successive elements of a received message before storage thereof with corresponding recognition signal elements from said store, a utilisation channel, a normally closed gate leading to said channel, means for applying received messages to said gate, means responsive to said comparison means for opening said gate when the recognition signal of a received message is similar to the recognition signal from said store, and means responsive to said comparison means for resetting said store and for restoring said comparison means to the quiescent condition when compared recognition signal elements are dissimilar.

2. Electrical communication or control apparatus having means for selecting messages in dependence upon multi-element binary code recognition signals, comprising a store for individually storing elements of a predetermined binary code recognition signal, a co-incidence device, means for applying an element of the recognition signal of a received message to said co-incidence device, means for applying the corresponding recognition signal element from said store to said co-incidence device, said co-incidence device being arranged to produce an output signal of one kind if signal elements applied to said co-incidence device are similar and to produce an output signal of a different kind if signal elements applied to said co-incidence device are dissimilar, means responsive to an output signal of the first kind from said co-incidence device for applying the next element of said predetermined recognition signal from said store to said co-incidence device for comparison with the next element of a received recognition signal, a utilisation channel, means for applying the remainder of a received message to said utilisation channel in response to an output signal of the first kind from said co-incidence device with the last recognition signal element applied to said co-incidence device from said store, and means for resetting said store in response to an output signal of said different kind from said co-incidence device to recondition the message selecting means.

3. Apparatus according to claim 2 said store comprising a binary shifting register.

4. Apparatus according to claim 2 comprising a source of timing signals of relatively high frequency, a normally inoperative counting circuit for said timing signals, means responsive to the beginning of an element of a received recognition signal for initiating operation of said counting circuit, the counting cycle of said counting circuit having the duration of an element of said recognition signal, means responsive to an intermediate count of said counting circuit to sample the output of said co-incidence device, and means responsive to the end count of said counting circuit to initiate another counting cycle.

5. Apparatus according to claim 4 comprising a two-state device, a gate normally closed in one condition to said two state device and normally open in the other condition of said two state device, means responsive to an intermediate count of said counting circuit preceding said first intermediate count to switch said two-state device to said second condition, means responsive to an output of said co-incidence device to restore said two-state device to its first-mentioned condition, means for applying a reset signal to said gate at the end of said sampling pulse, and means for resetting said store and said counting circuit in response to the passage of said reset pulses through said gate.

6. Apparatus according to claim 5 said resetting means comprising means for restoring said predetermined recognition signals to said store, and means for inhibiting the application of timing signals to said counting circuit.

7. Electrical communication or control apparatus having means for selecting messages in dependence upon a multi-element binary code recognition signal forming part of the messages, comprising a binary shifting register for storing a predetermined recognition signal, a co-incidence device, means for applying an element of a received recognition signal to said co-incidence device, means for applying the first recognition signal element from said register to said co-incidence device, said co-incidence device producing an output signal of one kind if the signals applied to said co-incidence device are similar and producing an output signal of a different kind if the signals applied to said co-incidence device are dissimilar, means responsive to an output signal of the first kind from said co-incidence device to advance the signal in said register by one element, thereby to apply the next element of said predetermined recognition signal to said co-incidence device, a utilisation channel, a normally closed gate leading to said channel, and means responsive to an empty-indication from said register to open said gate to the remainder of a received message and means responsive to an output signal of said different kind from the co-incidence device for resetting said register to store said predetermined recognition signal.

8. Electrical communication or control apparatus having means for selecting messages in dependence upon a multi-element alternating current recognitions signal forming part of the messages comprising a store for a predetermined recognition signal, comparison means responsive to a received message for comparing the elements of the received recognition signal with the corresponding recognition elements from said store, means for sensing the polarity of a received recognition signal element, polarity reversing means for reversing the polarity of a received message in dependence upon the polarity sensed by said sensing means, and means for selecting the received message in dependence upon said comparison means.

9. Apparatus according to claim 8 said sensing means comprising a two-state device normally in one state, means responsive to a signal element of one polarity to change said device to its other state, said polarity reversing means being normally inoperative, and a coupling from said two-state device to condition said polarity reversing means for operation in one state of said device, and means for inhibiting a change of state of said device after a first element of a received message.

10. Electrical communication or control apparatus having means for selecting messages in dependence upon a multi-element recognition signal forming part of the messages, each signal element comprising a non-zero signal portion, comprising a utilisation channel, a store for a predetermined recognition signal, comparison means, means responsive to an element of a received recognition signal for initiating operation of said comparison means to compare received recognition signal elements with corresponding elements from said store, means for discontinuing operation of said comparison means in response to a difference between compared elements, means for transmitting the remainder of a received message to said utilisation channel in response to agreement of the compared signal elements, means for inhibiting re-initiation of operation of said comparison means for an interval following each received element and longer than the duration of said element, whereby comparison cannot be re-initiated until after the end of a received message whether transmitted to said channel or not.

11. Electrical communication or control apparatus comprising a transmitter and a plurality of receivers, said transmitter comprising a source of timing signals of predetermined frequency, a counting circuit responsive to said timing signals for deriving signals of lower frequency, means for transmitting messages preceded by multi-element recognition signals having each element thereof timed by one of said derived signals, and each receiver comprising a source of timing signals of the same predetermined frequency and independent of said transmitter source, a source of a predetermined recognition signal, a normally inoperative counting circuit responsive to timing signals from said receiver source for deriving sampling signals of a lower frequency and of short duration compared with said recognition signal elements, means responsive to a received recognition signal element to render said receiver counting circuit operative, comparison means responsive to derived sampling signals for comparing each element of a received recognition signal with the corresponding recognition signal element from said source, a normally closed utilisation channel, and means for opening said channel in response to said comparison means.

12. Apparatus according to claim 11 comprising limiting means for rendering said comparison means responsive only to received elements in a limited amplitude range offset from zero.

13. Apparatus according to claim 12 said means for rendering operative said counting circuit being responsive to signal elements in a lower amplitude range.

References Cited in the file of this patent

UNITED STATES PATENTS

| | | |
|---|---|---|
| 2,409,696 | Lewis | Oct. 22, 1946 |
| 2,570,279 | Ridler et al. | Oct. 9, 1951 |
| 2,589,130 | Potter | Mar. 11, 1952 |
| 2,617,704 | Mallina | Nov. 11, 1952 |
| 2,626,383 | Coley | Jan. 20, 1953 |
| 2,634,052 | Block | Apr. 7, 1953 |
| 2,644,933 | Peterson | July 7, 1953 |
| 2,648,829 | Ayres et al. | Aug. 11, 1953 |
| 2,658,188 | Malthaner et al. | Nov. 3, 1953 |
| 2,669,706 | Gray | Feb. 16, 1954 |
| 2,670,463 | Raymond et al. | Feb. 23, 1954 |
| 2,679,034 | Albaighton | May 18, 1954 |
| 2,679,638 | Bensky | May 25, 1954 |
| 2,719,959 | Hobbs | Oct. 4, 1955 |
| 2,739,301 | Greenfield | Mar. 20, 1956 |